(12) United States Patent
Parkvall et al.

(10) Patent No.: US 8,073,454 B2
(45) Date of Patent: Dec. 6, 2011

(54) RESOURCE SCHEDULING IN A CELLULAR SYSTEM

(75) Inventors: Stefan Parkvall, Stockholm (SE); Pål Frenger, Linköping (SE); Erik Dahlman, Bromma (SE); Jonas Pettersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 704 days.

(21) Appl. No.: 12/158,480

(22) PCT Filed: Dec. 20, 2005

(86) PCT No.: PCT/SE2005/001998
§ 371 (c)(1),
(2), (4) Date: Jun. 20, 2008

(87) PCT Pub. No.: WO2007/073248
PCT Pub. Date: Jun. 28, 2007

(65) Prior Publication Data
US 2008/0318588 A1    Dec. 25, 2008

(51) Int. Cl.
*H04W 72/00* (2009.01)

(52) U.S. Cl. .............. 455/452.1; 455/450; 455/422.1; 455/464

(58) Field of Classification Search .......... 455/452.1, 455/450, 422.1, 464
See application file for complete search history.

(56) References Cited

U.S. PATENT DOCUMENTS 6,366,779 B1 * 4/2002 Bender et al. ............. 455/450
7,480,275 B2 * 1/2009 Moon et al. ............... 370/335

* cited by examiner

*Primary Examiner* — Nghi Ly

(57) ABSTRACT

A method for scheduling resources for uplink transmissions in a radio access network includes each of a plurality of access points (APs) placing its resources to the disposition of other APs and transmitting a blocking signal if it does not allow other APs to use any of its resources. The method includes a user terminal (UT) listening for blocking signals and an AP scheduling the UT on the AP's own resources and/or on resources belonging to one or more other APs.

35 Claims, 4 Drawing Sheets

RESOURCE SCHEDULING IN A CELLULAR SYSTEM

The invention relates to a method for scheduling radio resources in uplink transmissions in a cellular system. The invention also relates to a user terminal (UT), an access point (AP) and an access point controller (APC) adapted for use of the method.

TECHNICAL BACK GROUND

A cellular system has a limited amount of radio resources in form frequency bands, time slots, orthogonal codes and combinations thereof. A cellular system comprises a plurality of access points (APs), terminal units (TUs) and one or a few access point controllers (APCs).

In cellular systems it is crucial to somehow control of use of the radio resources. A radio communication link between a transmitter and a receiver is typically disturbing several other radio communication links that are occurring simultaneously in the system. Radio resource management (RRM) algorithms designed to address this problem typically belong to two fundamentally different categories: Centralized RRM methods and distributed RRM methods. Either the RRM method relies on having a central node (e.g. the APC) controlling how all the other nodes in the system (e.g. the APs and the UTs) use the radio resources, or the different nodes are given authority to make decisions them self on what radio resources to use. It is common when designing a cellular system to rely on both centralized and distributed RRM methods. Some decisions regarding the use of radio resources are taken by the central controller and other decisions may be taken by the other nodes in the system. There may also be a hierarchy of RRM nodes, e.g. an APC may delegate some RRM decisions to the APs and/or the UTs.

RRM methods may also be categorized into static versus dynamic RRM methods. In a static RRM method the available radio resources is divided into a plurality of separate resources and each node is allocated a subset of these resources on a static basis [ref. 1]. One example of a static RRM method is to deploy the system with a frequency re-use factor so that not all radio frequencies are allowed in every cell.

A problem with a static division of radio resources is that the load situation may be very different in the different cells. While one cell is heavily loaded and in the need of more resources the neighbouring cell might have unused resources left. System resources are not uses efficiently.

Dynamic RRM methods, on the other hand, constantly try to optimize and re-allocate the usage of the radio resources based on different types of information e.g. interference measurements and/or traffic load [ref. 2]. Nevertheless, the RRM decisions can be made in both centralized and decentralized ways.

In a cellular system the uplink and the downlink are fundamentally different in many ways and hence the RRM methods to be used in the uplink and downlink must be designed accordingly.

One important difference is that in the uplink the data to be transmitted is generated in the UT and a central RRM node will typically not know when a UT needs to transmit, or how much data it needs to transmit. Without this knowledge it is difficult for a centralized RRM method to make efficient decisions about the use of the radio resources. Typically for the uplink the UTs must inform the central node that it wants to transmit, and then the central RRM node (e.g. the APC) must process this information and make a decision which it then informs the UT about. This is typically a rather slow process, which causes delays in the system and the required signalling consumes radio resources, resulting in a degraded system performance. Hence, it would be desirable to find means for more efficient RRM methods.

Another fundamental difference between the uplink and the downlink is that the downlink signals directed to all different UTs are (typically) transmitted from the same physical location, i.e. the AP antenna. Hence each UT receives a signal consisting of a superposition of signals directed to all UTs that are affected by the channel from the AP to the corresponding UT. From the perspective of a single UT all downlink signals have passed trough the same radio channel. Hence, the relative power ratios between signals directed to different UTs are maintained in the downlink. In the uplink on the other hand, each UT transmitter is (typically) located in different physical positions and hence the AP receives a superposition of signals from the different UTs that have passed through different radio channels. An efficient RRM method for the uplink should be able to take advantage of this fact in some way. In [ref. 3] an automatic frequency allocation (AFA) algorithm is disclosed. AFA is intended for solving the problem of allocating channels (i.e. radio resources) to different APs. AFA is using a Hiperlan/2 (high performance radio local-area network, type 2) protocol that provides wireless multimedia communications between UTs and various broadband core networks.

DESCRIPTION OF THE INVENTION

The invention only applies to the uplink of a cellular radio system. The basic idea of the invention is to assign physical resources to all the APs but to also allow these resources to be shared between the APs in a fast way. To comply with this the invention proposes that resources pre-allocated to individual APs are treated as something that the APs always lend out to UTs in other cells, unless they (the APs) explicitly signal that they do not allow this. This is done as follows:

- An AP that wants to inform UTs in other cells that it does not allow them (the UTs in the other cells) to use the resources pre-assigned to this AP transmits a blocking signal to inform UTs in other cells about this (its desire not to lend out its pre-assigned resources).
- A UT that wants to be scheduled by an AP listens for any blocking signals from other APs.
- In its scheduling request the UT reports to the scheduling AP the blocking signals it (the UT) can detect.
- The scheduling AP will then schedule the UT either on the resources owned (pre-assigned) to the scheduling AP or on resources assigned to other APs for which the UT has reported that it can not detect the corresponding blocking signals. A UT that is scheduled to a resource not owned by the scheduling AP must stop transmitting immediately if it detects the blocking signal for the corresponding resource.

In the preferred embodiment of the invention the UT listens for blocking signals, before it sends the scheduling request. In an alternative embodiment the UT sends the scheduling request first and then listens for any possible blocking signals.

When a blocking signal is detected by an UT the UT reports to its serving AP the identity of the AP that is transmitting the blocking signal. Different strategies may then be used for re-scheduling the UT on other system resources.

In an embodiment of the invention the signal quality with which a UT hears a blocking signal is used by the UT for setting its transmission power. Preferably the transmission power is set inversely proportional to the signal quality although any other suitable function which relates the signal quality to the transmission power may be used.

In a further embodiment of the invention the signal quality of the detected blocking signals are reported to the APC and are used by the APC either for long-term resource allocation between APs or for dynamic resource allocation between APs. If there is an AP that often transmits blocking signals this indicates that the AP has too little resources allocated to it and that it should be granted more resources. Likewise, if there is an AP that seldom transmits blocking signals this indicates that the AP has too much radio resources allocated to it and that it should be granted less resources. In other words the APC shall redistribute resources on the APs according to statistics on blocking signals from individual APs.

These principles are applied in a method, an APC, an AP, and an UT, in accordance with the accompanying claims. By applying the above principles fast and efficient re-allocation of resources for uplink transmission is achieved.

Non-used resources at other APs are instantly available for use by an UT that has data to transmit, or for use by an AP in a cell with high traffic load. System resources are efficiently used in that unused resources pre-allocated to a cell are put to the disposition of UTs in other cells.

The invention relies on the fact that if a UT can hear the downlink transmission from an AP then it can also cause disturbance to that AP on the uplink. UTs that cannot detect a blocking signal are typically not causing any significant interference.

However if the uplink interference is not a problem to an AP then the AP should put its resources to the disposition of other cells and should not transmit a blocking signal when it experiences the uplink interference.

In order to better understand the present invention an example of pre-allocation of resources in accordance with common known technology is first described with reference to FIG. 1.

Figure 1:
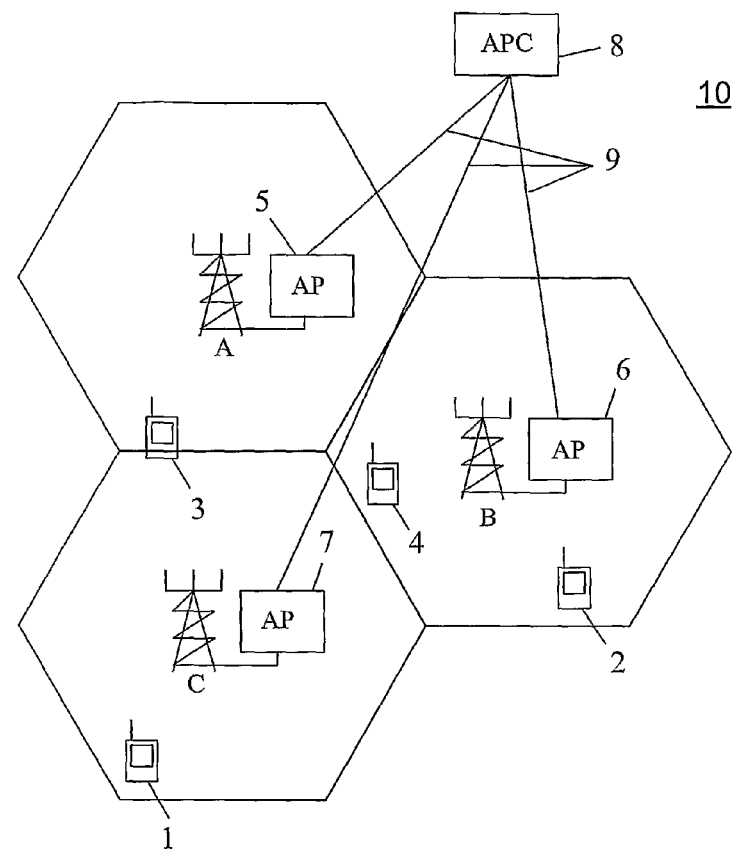
FIG. 1 is a general view of a cellular radio access network.

FIG. 1 illustrates a cellular radio access network comprising three cells A, B and C, schematically shown as hexagons, user terminals 1-4, access points 5-7, an access point controller 8 and land lines 9.

This invention focuses on the uplink and it is assumed that a scheduler in each AP controls the uplink resources in each cell. It is further assumed that resource coordination between the cells is coordinated by the APC. Each AP will be assigned a certain part of the overall radio resource that it will own and control. Typically the frequency domain is used to divide the radio resources between the APs and then each AP gets assigned a certain frequency range. Other means to divide the resources among APs are also possible, e.g., in the time domain or code domain, although the frequency domain is used as an example in the following.

Figure 2:
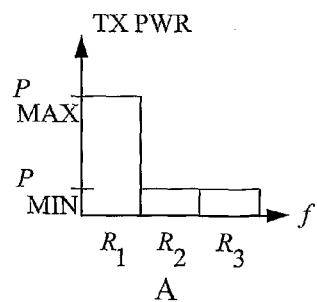
FIGS. 2-4 are diagrams illustrating the allocation of resources on the access points shown in FIG. 1.
Figure 3:
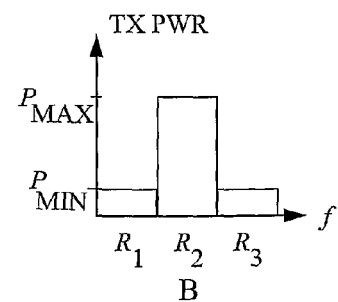
Figure 4:
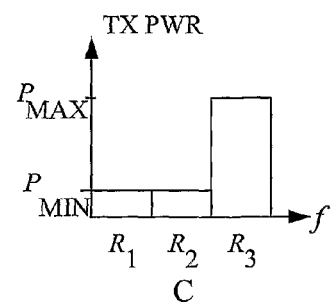

As shown in FIG. 2 the APC has allowed AP 5 in cell A to schedule users with the power $P_{max}$ in frequency band R1, and with the power $P_{min}$ in the frequency bands R2 and R3. This allocation ensures some basic interference separation between the cells and it allows each AP to schedule users within the cell using the pre-assigned resources. Likewise, as shown in FIG. 3, AP 6 in cell B is allowed to schedule users with the power $P_{max}$ in frequency band R1, and with the power $P_{min}$ in the frequency bands R2 and R3. As shown in FIG. 4 AP 6 in cell B is allowed to schedule users with the power $P_{max}$ in frequency band R1, and with the power $P_{min}$ in the frequency bands R2 and R3.

An UT that wants to transmit data on a scheduled resource in the uplink must tell the AP that it has some data to transmit by sending a scheduling request (SR), typically on a contention based channel, e.g. a random access channel (RACH), although periodic polling of the UTs status or other non-contention based methods could be envisioned. The AP will then reply with a scheduling grant (SG) message that includes information about what physical resources the UT should use.

A contention based channel is a channel adapted for transmission of the data the user intends to transmit. A session for transmission of large amounts of data, for example a video clip, requires a channel with large band width while a telephone call can take place on a channel having less band with requirements.

The UT can also start to transmit data directly on a contention based uplink channel if any such channel is available or on the RACH if that is possible. In that case the UT must know that it is not using resources that are pre-assigned to some other AP.

The problem with the static division of resources depicted in FIG. 2-4 is that the load situation may be very different in the cells. While one cell is heavily loaded and in the need of more resources, the neighbouring cells might have unused resources left. To change the static resource allocation would involve informing the APC and waiting for the APC to decide on moving resources from a lightly loaded cell to a heavily loaded cell. This can be a rather slow process compared to the scheduling decisions, which typically are taken in the APs. By letting the APs take the scheduling decisions scheduling becomes a quick process adapted to cope with the rapidly varying resource requirements.

PREFERRED EMBODIMENTS

Figure 5:
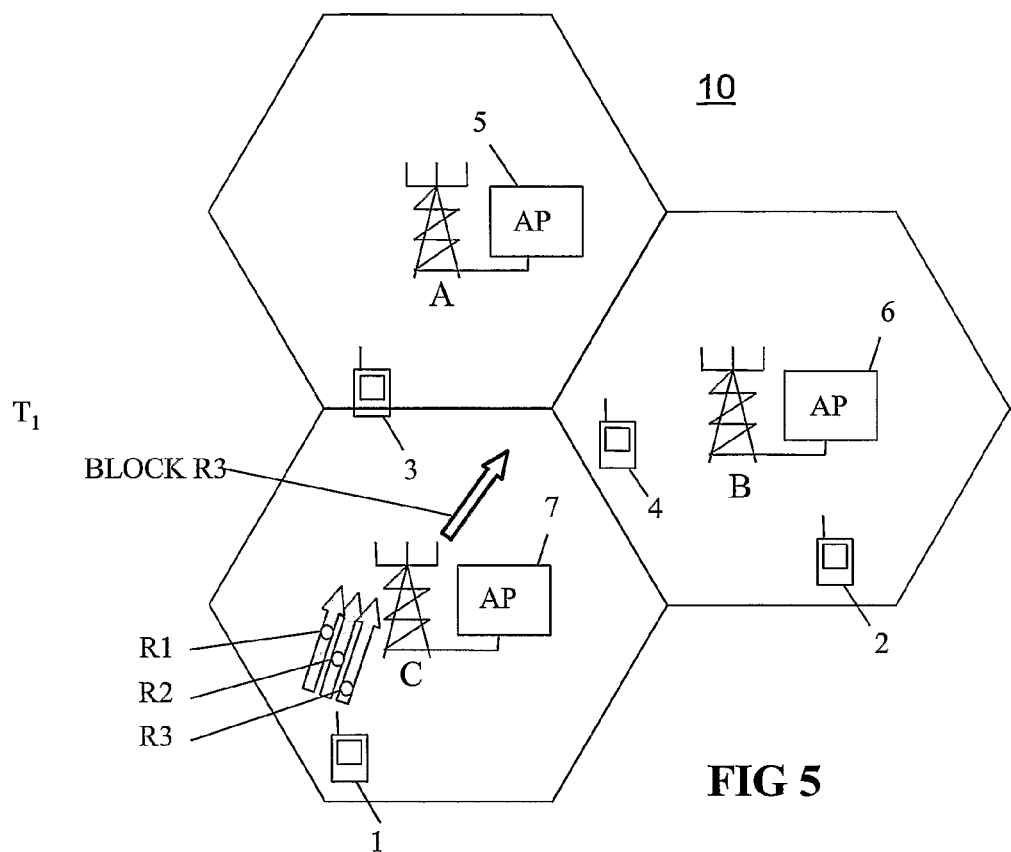
FIG. 5 is a view similar to FIG. 1 illustrating resource scheduling in the uplink in accordance with the present invention, at a certain time instant.

Using the idea behind the invention and the points listed above refer to FIG. 4 and FIG. 5 we assume that UT 1 is at time $T_1$ communicating with AP 7 using all available uplink capacity R1, R2 and R3. AP 7, being fully loaded, is therefore sending out a blocking signal BLOCK R3 to inform UTs in neighbouring cells that it is not allowed to borrow frequency band R3 at the moment. Since none of the other APs transmits any blocking signal and consequently UT 1 does not detect any blocking signal all three resources R1, R2 and R3 are used by UT 1. This situation is depicted in FIG. 5.

Figure 6:
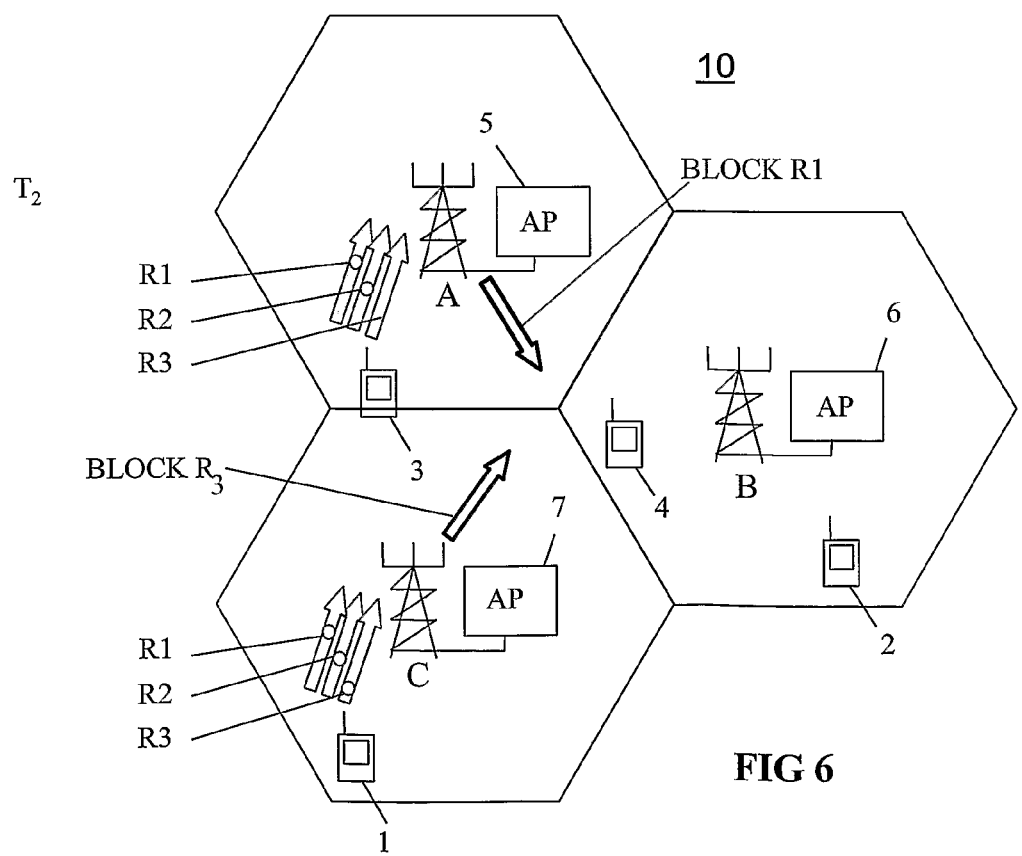
FIG. 6 is a view similar to FIG. 5 illustrating resource scheduling at a certain later time instant.

At a later time $T_2$ user terminal UT3 wants to transmit data. It detects the blocking signal BLOCK R3 for R3 but not for R2 (since no such blocking signal is transmitted). UT3 informs its AP5 in the scheduling request that it wants to communicate using the resources R1 and R2. The resource R3, which is not used since the blocking signal R3 for this resource is detected by UT3, is indicated by the white arrow R3 in FIG. 6.

The AP5 grants this request and since AP5 now uses all of its resources, it also transmits a blocking signal BLOCK R1. At time $T_2$ we have the situation depicted in FIG. 6.

User terminal UT1 is located far away from AP5 and it does not detect the blocking signal for R1. Therefore UT1 continues to transmit on resource R1.

At an even later time $T_3$ user terminal 4 wants to transmit and it detects both blocking signals for the resources R1 and R3. It informs AP 6 that it wants to communicate on resource R2 and is granted this. At time $T_3$ the transmission has started and AP 6 sends out a blocking signal BLOCK R2 for resource R2. This blocking signal is detected by UT 3 but not by UT 1. As a result UT3 stops using the resource R2 and UT1 continues to transmit on resource R1.

Having explained the mechanisms for controlling scheduling and re-scheduling of radio resources in the uplink some strategies for re-scheduling on resources will now be explained.

Figure 7:
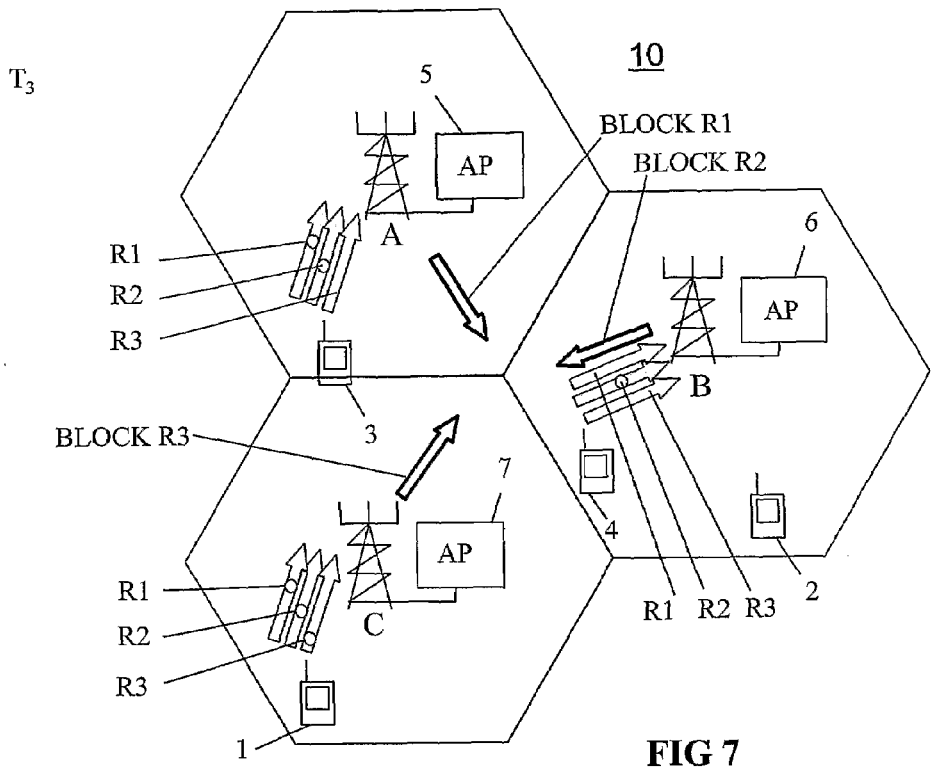
FIG. 7 is a view similar to FIG. 6 illustrating resource scheduling in the uplink in accordance with the present invention, at a certain later time instant.

An AP that schedules a UT to a resource it does not own must be prepared that the UT may not be able to use this resource. If no transmission is received the AP can assume that the UT detected a blocking signal for this resource and the AP should then preferably schedule the UT again on some other resource. For example when UT3 in FIG. 7 detects the blocking signal BLOCK R2 and stops using resource R2, AP5 detects this and then AP5 may try to schedule UT3 on any of the resources owned by respective APs in the four non-shown neighbouring cells to cell A, thereby excluding resources belonging to the APs in cells A and B. Alternatively the UT may have to send a new scheduling request to explicitly inform the scheduling AP that it is not allowed to use the corresponding resource any longer.

An AP thus detects the under-use of resources that the AP granted to the UT and based on information on this under-use the AP takes a re-scheduling decision.

An alternative solution to the same problem is the following: All APs continuously listens to scheduling requests from UTs within the cell and in other cells. A UT that wants to transmit data selects an AP and sends a scheduling request indicating what resources it wants to use to that AP. Other APs listen for the scheduling request. Those which can hear the request and which does not want the requesting UT to use their respective resources transmit a blocking signal to the UT. The scheduling AP schedules the UT to a suitable resource. If the UT is scheduled to a resource not owned by the scheduling AP it can only use that resource if it does not receive any blocking signal from any other AP.

An AP in the cell serving the UT that transmits a scheduling request will hear the request. Neighbouring cells will also hear this request and will, if applicable, instantly transmit their respective blocking signals. The serving cell will therefore take its grant decision without being aware of these blocking signals.

In the first preferred method previously described the UT listens for blocking signals before it sends the scheduling request and in the second method the UT sends the scheduling request first and then listens for any possible blocking signals. The difference is minor.

A UT may include information about how well it can receive each of the blocking signals. This information relate to the signal quality, such as noise figure, bit error rate and signal attenuation. If a UT hears a blocking signal strongly then it should avoid that resource, in the example the given frequency band, all together. But if it can detect a blocking signal only weakly then it could use that resource with somewhat reduced power. The transmission power to be used on resource may be a function of the signal quality of the corresponding blocking signal for that resource. Setting the transmission power inversely proportional to the signal quality of the received blocking signal is the preferred solution. Instead of measuring the strength on the blocking signal only, the UT could perform a similar measure on another signal with known transmission power, e.g., a common pilot signal.

The following is an example of how an APC, having information on the presence of blocking signals, can provide a long-term resource allocation or a dynamic resource allocation between APs. Either an AP or a UT reports the presence of a blocking signal to the APC.

Start by allocating all resources to all APs. If an AP reports to the APC that the UTs which it is scheduling often receive blocking signals from other APs, the APC divides the resource for which blocking signals often are received between the involved APs. In this manner APs which have a high traffic load will be allocated more resources.

If an AP reports to the APC that resource collisions seldom occur, the APC may decide to allocate less radio resources to that AP.

Figure 8:
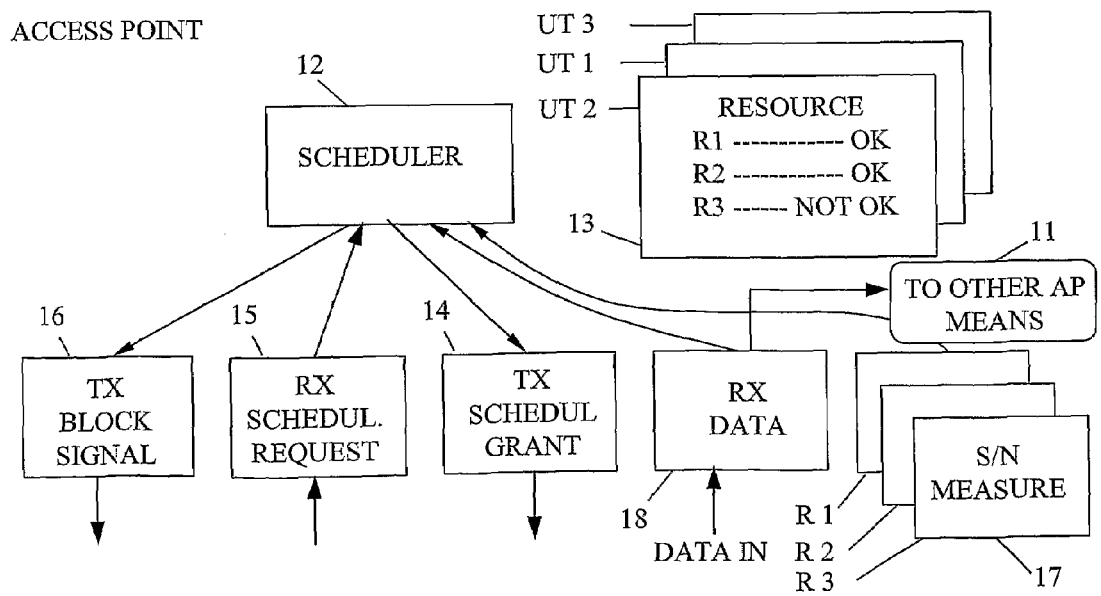
FIG. 8 is a functional oriented block diagram of an AP in accordance with the invention.

The functional oriented block diagram in FIG. 8 shows an AP in accordance with the invention. Further to the conventional means symbolically illustrated by block 11, it comprises a scheduler 12 that has one resource list 13 per UT. The scheduler has knowledge of each resource allocated to a UT which the scheduler serves. In particular the scheduler knows weather a resource can be used or not. The scheduler takes scheduling decisions and forwards these decisions to a transmitter 14 for transmission of grant decisions. A receiver 15 receives scheduling requests from the UTs served by the AP. The AP has a transmitter 16 for transmission of blocking signals. A blocking signal is transmitted whenever the AP decides that it needs exclusive use of the radio resources that got pre-assigned to the AP. The decision on when to transmit the blocking signal may be based on the current interference situation on the associated radio resource or on the current traffic load situation. There are means 17 for measuring the interference on each resource R1-R3 in the system, for example the S/N ratio. The interference measuring means 17 is adapted to trigger the transmission of a blocking signal when the AP detects that a UT in a different cell starts to use the resources of the AP when the AP itself needs to use the resources. Data signals transmitted from a UT on the uplink are received by the AP by a receiver 18. The data signals are forwarded to and subject to further processing by the conventional means 11. The AP further comprises means 19A for detecting under-use of radio resources that the scheduler has allocated to an UT, and means 19B for re-scheduling of radio resources to an UT under-using its scheduled resources.

The AP also comprises an optional receiver 19 that listens for blocking signals from other APs and forwards this information to the scheduler 12.

Figure 9:
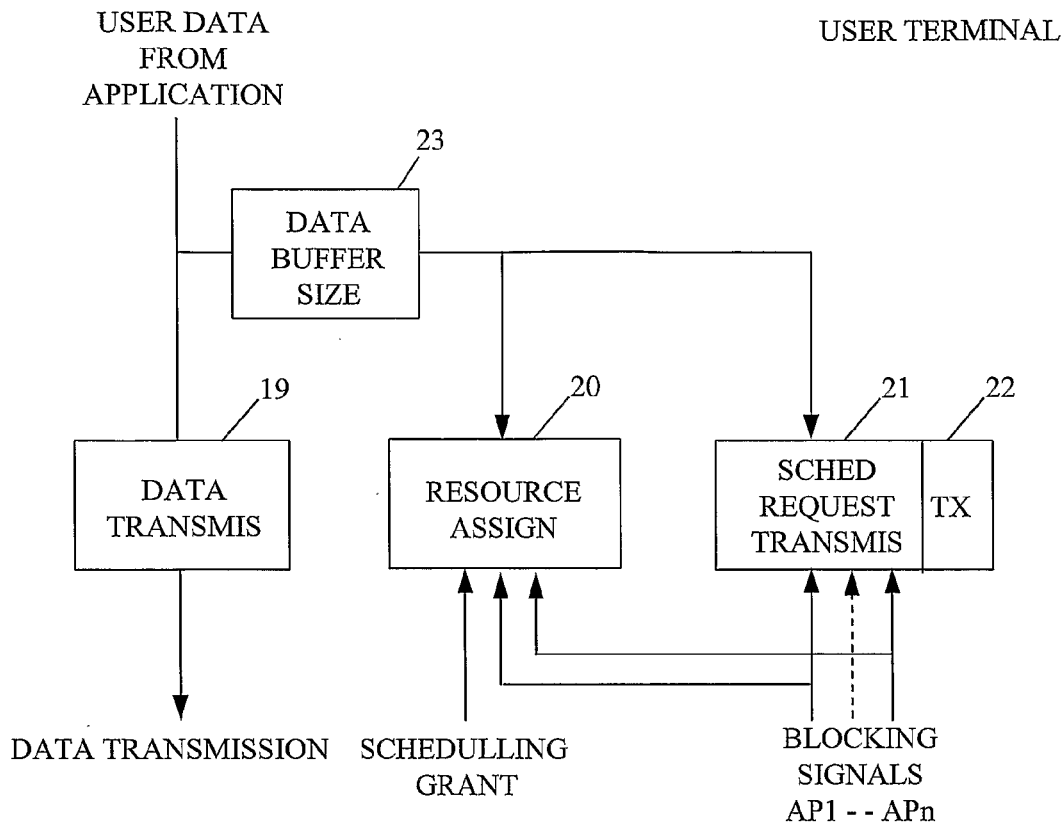
FIG. 9 is a functional oriented block diagram of a UT in accordance with the invention.

The UT shown in FIG. 9 comprises a conventional transmitter 20 for data that has been generated by a non-shown application. Further to conventional UT means not shown, the UT comprises a receiver 21 for receiving blocking signals from other APs, for receiving of scheduling grant decision signals, and for receiving information on the radio resources the UT is allowed to transmit on. The UT further comprises means 21A for aborting the UT's transmission on radio resources on which the UT is scheduled upon detection of a blocking signal from an AP owning these resources. Detection means 21B detect the signal quality of a blocking signal or pilot tone transmitted by an AP. Based on the reported channel quality a control device 21C controls the UT's transmission power setting for the resources associated with the AP transmitting a blocking signal. There is a device 21D that inserts, in a scheduling request, the identities of APs from which blocking signals are received. The UT also comprises means 21E for triggering the transceiver 23 to send a renewed scheduling request when the UT detects a blocking signal transmitted from an AP owning the radio resource on which the AP is scheduled. There is a scheduling request device 22 connected to a transmitter 23 for transmission of a scheduling request to an AP. A data buffer 24 provides information on the number of data units the UT wants to transmit. This number is typically included in the scheduling request.

The UT must, in the first embodiment of the invention, also provide information to its serving AP about any blocking signals the UT can detect. In particular the UT must provide the identities of the APs which transmit blocking signals. In FIG. 9 the APs in the network are labelled AP1, - - - APn, n being an integer.

Figure 10:
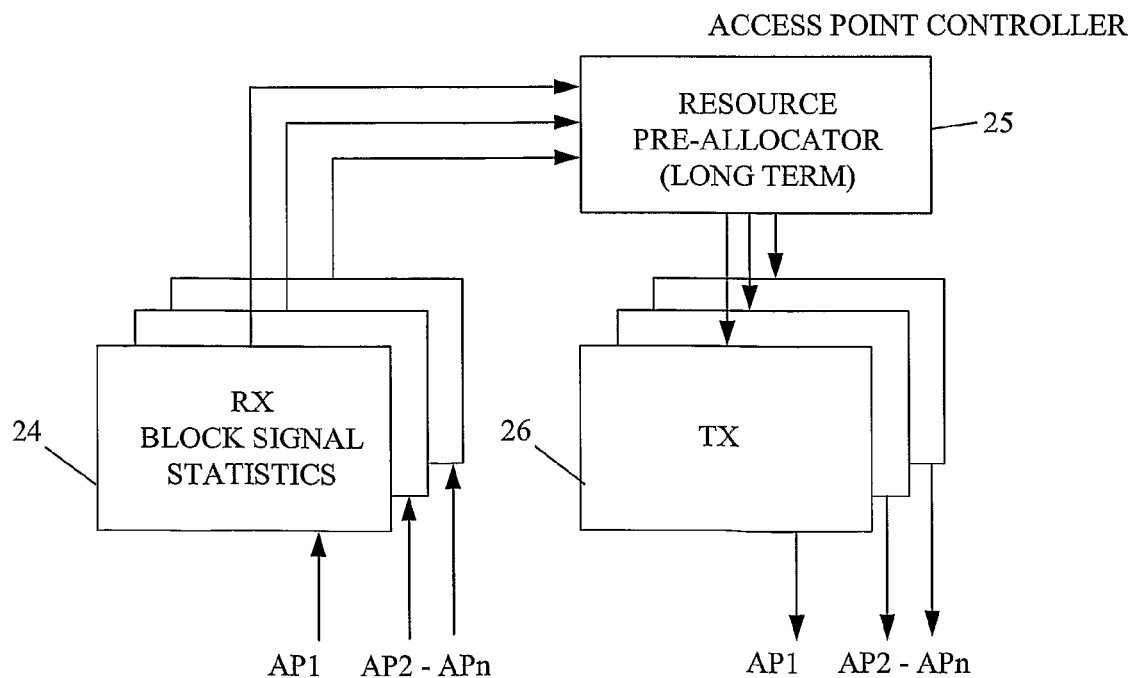
FIG. 10 is a functional oriented block diagram of an APC in accordance with the invention.

The APC shown in FIG. 10 is comprises a receiver 25 for receiving information relating to blocking signals and for providing statistics on this received information. There is one receiver 25 per each AP in the network. A device 26 for long-term pre-allocating of resources to individual APs provides pre-allocation of resources on a long-term basis based on blocking signal statistics from individual APs. The APC further includes re-allocation means 26A for long term re-allocation of the pre-allocated radio resources among APs based on statistics relating to blocking signals transmitted from APs. As noted above an AP that often transmits a blocking signal may be allocated increased resources, while an AP that seldom transmits blocking signals probably owns too much and therefore shall have its resources reduced. Each of the APs controlled by the APC is communicated the result of the pre-allocations made by the device 26. The APC comprises one transmitter 27 per AP. An AP that receives information on its pre-assigned resources updates its resource lists 13 accordingly.

It should be noted that the APC does not receive any "physical" blocking signals. Blocking signals are detected and processed by the UTs and possibly also by the APs. The UTs tells their serving AP about which blocking signals they detect, the AP may also listen for blocking signals and the APs may forward that information to the APC in some way. Processing, such as averaging, may be performed by the AP. There may be an optional device in the AP deciding whether the APC should be informed about the statistics of the blocking signals or not. The reason to inform the APC about any blocking signals is to allow for re-allocation of the pre-assigned resource division between the APs.

[ref. 1] "Principles of Mobile Communication", Gordon L Stüber, Kluwer Academic Publishers, 1996, pp. 14.

[ref. 2] "The performance of adaptive frequency allocation in an environment on non-cooperative interference", Johan Bergkwist and Olav Queseth, S/3 Radio Communication Systems, KTH, Kista, Sweden, available at www.s3.kth.se/radio/Publication/Pub2004/OlavQueseth2004.

[ref. 3] J. Huschke, G. Zimmermann: "Impact of Decentralized Adaptive Frequency Allocation on the System Performance of HIPERLAN/2", Proceedings of IEEE Conference on Vehicular VTC'2000 Spring, vol. 2, pp 895-900, Tokyo, Japan.

The invention claimed is:

1. A method for scheduling resources for uplink transmissions in a radio access network comprising a plurality of access points (AP) each one owning pre-assigned resources, and user terminals (UT), including the steps of:

each AP placing its resources to the disposition of other APs, each AP transmitting a blocking signal if it does not allow other APs to use any of its resources, each UT listening for blocking signals, and one of the UTs stopping its transmission upon detection of a blocking signal from an AP owning a resource on which the UT is transmitting, an AP serving a UT scheduling the UT on its own resources and/or on resources belonging to one or more other APs, and one of the UTs sending a scheduling request to an AP and including therein an indication of an amount of data to be transmitted and information on APs from which the UT detects blocking signals.

2. A method in accordance with claim 1, characterized by each UT measuring a signal quality of the blocking signals it detects.

3. A method in accordance with claim 2, characterized by including in the scheduling request a signal quality of the detected blocking signals.

4. A method in accordance with claim 3, characterized by setting the transmission power on a resource, which belongs to an AP from which a blocking signal was detected, as a function of the signal quality of the blocking signal so that the better the signal quality of a blocking signal is, the less is the transmission power.

5. A method in accordance with claim 4, characterized by using as the function a function that is inversely proportional to the signal quality.

6. A method in accordance with claim 5, characterized by using as function a quantised function.

7. A method in accordance with claim 6, characterized by using as function a quantised function.

8. A method in accordance with claim 1, characterized by a UT receiving blocking signals from one or more APs measuring the signal quality of a pilot tone transmitted from the respective APs from which blocking signals were received.

9. A method in accordance with claim 8, characterized by setting the transmission power on a resource, which belongs to an AP from which a blocking signal was detected, as a function of the signal strength of the pilot tone transmitted by that AP, so that the better the signal quality of the pilot tone, the less is the transmission power.

10. A method in accordance with claim 9, characterized by using as the function a function that is inversely proportional to the signal quality.

11. A method in accordance with claim 1, characterized by an AP scheduled on resources that belong to one or more other APs listening for blocking signals before transmitting, sending a renewed scheduling request to its serving AP if it detects a blocking signal from one of said one or more APs, and including in the request information on the blocking signals it currently detects.

12. A method in accordance with claim 1, characterized by an AP, not receiving transmission from a UT on a resource it scheduled on the UT, re-scheduling resources on the UT.

13. A method in accordance with claim 12, characterized by the AP taking the re-scheduled resources among APs from which no blocking signals were detected by the UT, this time excluding said one or more APs.

14. A method in accordance with claim 1, characterized by each AP listening for scheduling requests signals from the UTs, thereby gaining information on UTs that potentially may be scheduled on its resources, and each AP on basis of received scheduling requests taking a decision to transmit a blocking signal.

15. A method in accordance with claim 14, characterized by each UT measuring a signal quality of the blocking signals it detects.

16. A method in accordance with claim 15, characterized by a UT reporting to its serving AP the signal quality of the blocking signals it detects.

17. A method in accordance with claim 16, characterized by setting the transmission power on a resource, which belongs to an AP from which a blocking signal was detected, as a function of the signal quality of the blocking signal so that the better the signal quality of a blocking signal is, the less is the transmission power.

18. A method in accordance with claim 17, characterized by using as the function a function that is inversely proportional to the signal quality.

19. A method in accordance with claim 18, characterized by using as function a quantised function.

20. A method in accordance with claim 19, characterized by a UT receiving blocking signals from one or more APs measuring the signal quality of a pilot tone transmitted from the respective APs from which blocking signals were received.

21. A method in accordance with claim 20, characterized by setting the transmission power on a resource, which belongs to an AP from which a blocking signal was detected, as a function of the signal strength of the pilot tone transmitted by that AP, so that the better the signal quality of the pilot tone, the less is the transmission power.

22. A method in accordance with claim 21, characterized by using as the function a function that is inversely proportional to the signal quality.

23. A method in accordance with claim 22, characterized by using as function a quantised function.

24. A method in accordance with claim 23, characterized by an AP scheduled on resources that belong to one or more other APs listening for blocking signals before transmitting, sending a renewed scheduling request to its serving AP if it detects a blocking signal from one of said one or more APs, and including in the request information on the blocking signals it currently detects.

25. A method in accordance with claim 24, characterized by an AP, not receiving transmission from a UT on a resource it scheduled on the UT, re-scheduling resources on the UT.

26. A method in accordance with claim 25, characterized by the AP taking the re-scheduled resources among APs from which no blocking signals were detected by the UT, this time excluding said one or more APs.

27. A method in accordance with claim 1, wherein the radio access network comprises an access point controller (APC) for pre-allocation of resources to each AP, an AP thereby owning its pre-allocated resources, characterized by reporting detected blocking signals to the APC, the APC using this information as a basis for long term resource allocation between APs.

28. A method in accordance with claim 27, characterized by the APC increasing the pre-allocated resources of an AP that often transmits blocking signals.

29. A method in accordance with claim 27, characterized by the APC reducing the pre-allocated resources of an AP that seldom receives blocking signals.

30. An access point (AP) for use in a radio access network comprising a plurality of access points, and user terminals (UT), the access point comprising:
scheduling means for scheduling UTs on resources, and
receiving means for receiving scheduling requests from UTs wanting to send information, wherein each scheduling request includes an indication of an amount of data to be transmitted by a requesting UT and information on APs from which the requesting UT detects blocking signals, and
means for transmitting a blocking signal when the AP does not allow other APs to use any of its owned resources, and the scheduling means being adapted to schedule the requesting UT on the AP's own resources and/or on resources belonging to one or more other APs responsive to received scheduling requests.

31. An access point in accordance with claim 30, characterized by means for detecting under-use of resources scheduled on an UT, means for re-scheduling an UT under-using its scheduled resources.

32. An access point in accordance with claim 30, characterized by means for extracting, from scheduling requests, information on APs that are transmitting blocking signals.

33. An method for operating an access point (AP) in a radio access network, the method comprising:
receiving, at an access point (AP), a scheduling request from a user terminal (UT) wanting to send information, wherein the scheduling request includes an indication of an amount of data to be transmitted by the UT and information on access points (APs) from which the requesting UT detects blocking signals, and
transmitting a blocking signal from the AP when the AP does not allow other APs to use any of its owned resources, and
in response to the received scheduling request, scheduling the UT on the AP's own resources and/or on resources belonging to one or more other APs responsive to received scheduling requests.

34. A method in accordance with claim 33, further comprising:
detecting under-use of resources scheduled for the UT, and
in response to detecting the under-use, re-scheduling the UT on resources.

35. An method in accordance with claim 33, further comprising extracting, from the scheduling request, information on APs that are transmitting blocking signals.

* * * * *

UNITED STATES PATENT AND TRADEMARK OFFICE
CERTIFICATE OF CORRECTION

PATENT NO.         : 8,073,454 B2                                Page 1 of 1
APPLICATION NO.    : 12/158480
DATED              : December 6, 2011
INVENTOR(S)        : Parkvall et al.

It is certified that error appears in the above-identified patent and that said Letters Patent is hereby corrected as shown below:

In Column 2, Line 13, delete "trough" and insert -- through --, therefor.

In Column 4, Line 31, delete "band with" and insert -- bandwidth --, therefor.

In Column 6, Line 30, delete "weather" and insert -- whether --, therefor.

In Column 8, Line 49, in Claim 11, delete "anAP" and insert -- an AP --, therefor.

In Column 10, Line 30, in Claim 33, delete "An" and insert -- A --, therefor.

In Column 10, Line 50, in Claim 35, delete "An" and insert -- A --, therefor.

Signed and Sealed this
Twenty-first Day of February, 2012

David J. Kappos
*Director of the United States Patent and Trademark Office*